United States Patent [19]

Matsuoka

[11] Patent Number: 5,669,475
[45] Date of Patent: Sep. 23, 1997

[54] TORQUE CONVERTOR

[75] Inventor: Yoshihiro Matsuoka, Neyagawa, Japan

[73] Assignee: Exedy Corporation, Osaka, Japan

[21] Appl. No.: 625,855

[22] Filed: Apr. 1, 1996

[30] Foreign Application Priority Data

Apr. 7, 1995 [JP] Japan .................................. 7-082192

[51] Int. Cl.$^6$ ................................................ F16H 45/02
[52] U.S. Cl. ................................ 192/3.29; 192/3.3
[58] Field of Search ........................... 192/3.28, 3.29, 192/3.3

[56] References Cited

U.S. PATENT DOCUMENTS

| | | | |
|---|---|---|---|
| 4,844,216 | 7/1989 | Kukushima | 192/3.29 X |
| 5,062,517 | 11/1991 | Muchmore et al. | 192/3.29 X |
| 5,086,892 | 2/1992 | Schierling | 192/3.29 |
| 5,195,621 | 3/1993 | Dull et al. | 192/3.29 |
| 5,377,796 | 1/1995 | Friedmann et al. | 192/3.29 |
| 5,590,750 | 1/1997 | Graton et al. | 192/3.29 |

*Primary Examiner*—Richard M. Lorence
*Attorney, Agent, or Firm*—Shinjyu Office of Patent Attorney

[57] ABSTRACT

A torque convertor is provided with a lockup clutch having a plurality of frictional surfaces. The lockup clutch includes coil springs for coupling an inertia plate and a front cover with each other in the circumferential direction. A piston plate is disposed between a turbine and the inertia plate and engaged with the turbine. An output plate is disposed between the front cover and the inertia plate and is fixed to the turbine. A hydraulic pressure control device controls the hydraulic oil pressure inside the torque convertor in order to frictionally engage or disengage the output plate, the inertia plate, and the piston plate with each other.

8 Claims, 6 Drawing Sheets

TORQUE CONVERTOR

BACKGROUND OF THE INVENTION

1. Field of the Invention

The present invention relates to a torque convertor, and more particularly to a torque convertor having a lockup clutch disposed between a power input front cover and a turbine.

2. Description of the Related Art

FIG. 6 is a force diagram showing a dynamic model of a prior art torque convertor 60. The torque convertor 60 includes a power input front cover 51, an impeller 52, a turbine 53 and a stator (not shown). A lockup clutch 54 is provided to directly couple the power input front cover 51 with the turbine 53, and includes frictional plates 55, a piston 56 and coil springs 57. When the frictional plates contact one another, the torque converter 60 becomes locked up, thus increasing the torque convertor 60 capacity to transmit torque.

This type of power transmission system may be divided into a power input portion and a power output portion, separated by the coil spring 57 of the lockup clutch 54 therebetween. The piston 56 and the frictional plate portion 55 function as members of the power input portion.

The operation of the prior art torque convertor 60 will now be explained. When the vehicle transmission is engaged and the vehicle begins to move, torque is applied from the power input front cover 51 to the impeller 52, causing the impeller 52 to urge hydraulic fluid within the torque converter 60 to move toward the turbine 53 and causing turbine 53 to rotate. When the rotation speed of a power input shaft of the transmission reaches a predetermined level, the piston 56 is moved toward the power input front cover 51 by hydraulic force, thereby pressing frictional plates 55 between the power input front cover 51 and the piston 56. When this occurs, torque is transmitted directly from the power input front cover 51 to the turbine 53. Because the torque is mechanically transmitted, the vehicle may operate at a good fuel consumption rate.

However, with this type of prior art torque converter, a moment of inertia of the power input portion is larger than a moment of inertia of the power output portion. This makes the resonant frequency of the torque converter equal to or greater than the idle speed of the engine associated with the torque converter, thereby allowing abnormal noise and vibration to be generated by the vehicle during normal driving conditions. In addition, since the piston 56 and the frictional plates 55 function as the members of the power input portion, the ratio of the moment of inertia of the power input portion to the power output portion is further increased, thereby exacerbating the problem.

SUMMARY OF THE INVENTION

It is therefore an object of the present invention to provide a torque convertor that includes a lockup clutch having a plurality of frictional surfaces, in which the ratio of moment of inertia of the power output portion to the power input portion is increased compared to prior art configurations.

According to one aspect of the present invention, a torque convertor includes a torque convertor main body having a front cover and an impeller fixed to the front cover. The impeller and the front cover define a hydraulic oil chamber, and a turbine disposed within the hydraulic oil chamber is opposed to said impeller.

A lockup clutch is disposed between the front cover and the turbine. The lockup clutch includes an annular first plate disposed between the front cover and the turbine, an elastic member which couples the first plate and the front cover in a circumferential direction, an annular piston plate disposed between the turbine and the first plate, and an annular second plate disposed between the front cover and the first plate and fixed to the turbine. The piston plate is engaged the turbine for rotation therewith and movable in the axial direction with respect to the turbine.

A hydraulic pressure control device is connected to the torque converter main body, and controls the hydraulic pressure within an interior of the hydraulic oil chamber in order to control coupling and uncoupling of the first plate, the second plate and the piston plate.

In the torque convertor according to the present invention, the lockup clutch is disengaged by adjusting the hydraulic pressure within the hydraulic oil chamber with the hydraulic pressure control device. When this occurs, the torque is transmitted from the impeller to the turbine by means of the hydraulic oil.

When the lockup clutch is engaged, the torque is transmitted to the first plate through the elastic member, and is then transmitted to the turbine through the second plate and the piston plate. At this time, both axial surfaces of the first plate function as friction surfaces. In addition, the first plate, the second plate and the piston plate serve as members of the output mechanism in the power transmission system. As a result, the ratio of the moment of inertia of the output mechanism to the input mechanism is sufficiently increased, such that the resonant frequency in the power transmission system is decreased to a level equal to or less than the engine idle speed. As a result, there may be a reduced level of abnormal noise and vibration generated by the transmission during normal driving conditions.

According to another aspect of the present invention, the torque convertor includes annular friction members fixed to opposing axial surfaces of an outer circumferential portion of the first plate, and flat annular surfaces formed on the piston plate and the second plate opposite the friction members.

By fixing annular friction members to both axial surfaces of the outer circumferential portion of the first plate, the flat surfaces of the piston plate and the second plate are brought into contact with both friction members on the first plate upon clutch engagement.

According to yet another aspect of the present invention, the turbine includes a turbine shell, a plurality of turbine blades fixed to the turbine shell, and a turbine hub fixed to an inner circumferential portion of the turbine shell. An inner circumferential portion of the first plate and an inner circumferential portion of the piston plate are supported by an outer circumferential portion of the turbine hub and are movable in the axial direction with respect to the turbine hub. In addition, the first plate further includes a plurality of holes formed therein, an inner circumferential portion of the second plate is fixed to the turbine hub, and a passage is formed in the turbine hub which allows hydraulic oil to be charged into or discharging hydraulic oil from a space formed between the first and second plates by means of the hydraulic pressure control device.

By charging this space with hydraulic oil when the lockup clutch is engaged, the first plate is displaced toward the turbine and is separated from the second plate. Subsequently, the hydraulic oil flows into the space between the first plate and the piston place through the holes in the first plate. This action displaces the piston plate toward the turbine, thereby disengaging the lockup clutch. When the hydraulic oil in the space between the first plate and the second plate is allowed to drain from the passage by the hydraulic pressure control device, the first plate is displaced toward the second plate. The hydraulic oil in the space between the first plate and the piston plate then drains through the holes of the first plate, thereby displacing the piston plate toward the first plate and engaging the lockup clutch.

According to yet another aspect of the present invention, the torque convertor further includes a hub fixed to an inner circumferential portion of the front cover. An inner circumferential portion of the second plate is in contact with an outer circumferential portion of the hub, a seal member is disposed between the inner circumferential portion of the second plate and the outer circumferential portion of the hub, and a space is formed between the front cover and the second plate, the space in fluid communication with an outer circumferential side of the torque convertor main body.

When the seal member is disposed between the inner circumferential portion of the second plate and the outer circumferential portion of the hub, the inner circumferential side of the space between the second plate and the front cover is sealed from the space between the second plate and the first plate, and the outer circumferential side thereof is in fluid communication with the torque convertor main body. As a result, a high level of hydraulic pressure may be maintained in the space between the second plate and the front cover as well as in the torque convertor main body. In addition, because the second plate is formed from a heavy gauge metal, it is able to withstand the load applied by the first plate and the piston plate when the lockup clutch is engaged.

According to yet another aspect of the present invention, the torque convertor further includes an annular weight member fixed to the outer circumferential portion of the first plate. The annular weight member increases the ratio of the moment of inertia of the output mechanism to the input mechanism upon clutch engagement, and may thereby further reduce the level of abnormal noise and vibration generated during normal driving operations.

According to yet another aspect of the present invention, the impeller further includes an impeller shell and a plurality of impeller blades fixed to the impeller shell, with an outer circumferential portion of the impeller shell being fixed to an inner surface of an outer circumferential portion of said front cover. In addition, the outer circumferential portion of the impeller shell is disposed adjacent to the weight member, and axial movement of the weight member toward the turbine is restricted by the outer circumferential edge of the impeller shell.

By configuring the impeller shell and the weight member in this manner, the axial movement of the weight member is restricted by the outer circumferential portion of the impeller shell when the first plate is displaced toward the turbine. This prevents the first plate from coming into contact with the piston plate during lockup clutch disengagement and thereby allowing drag torque to be reduced, irrespective of the flow of the hydraulic oil.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

Figure 1:
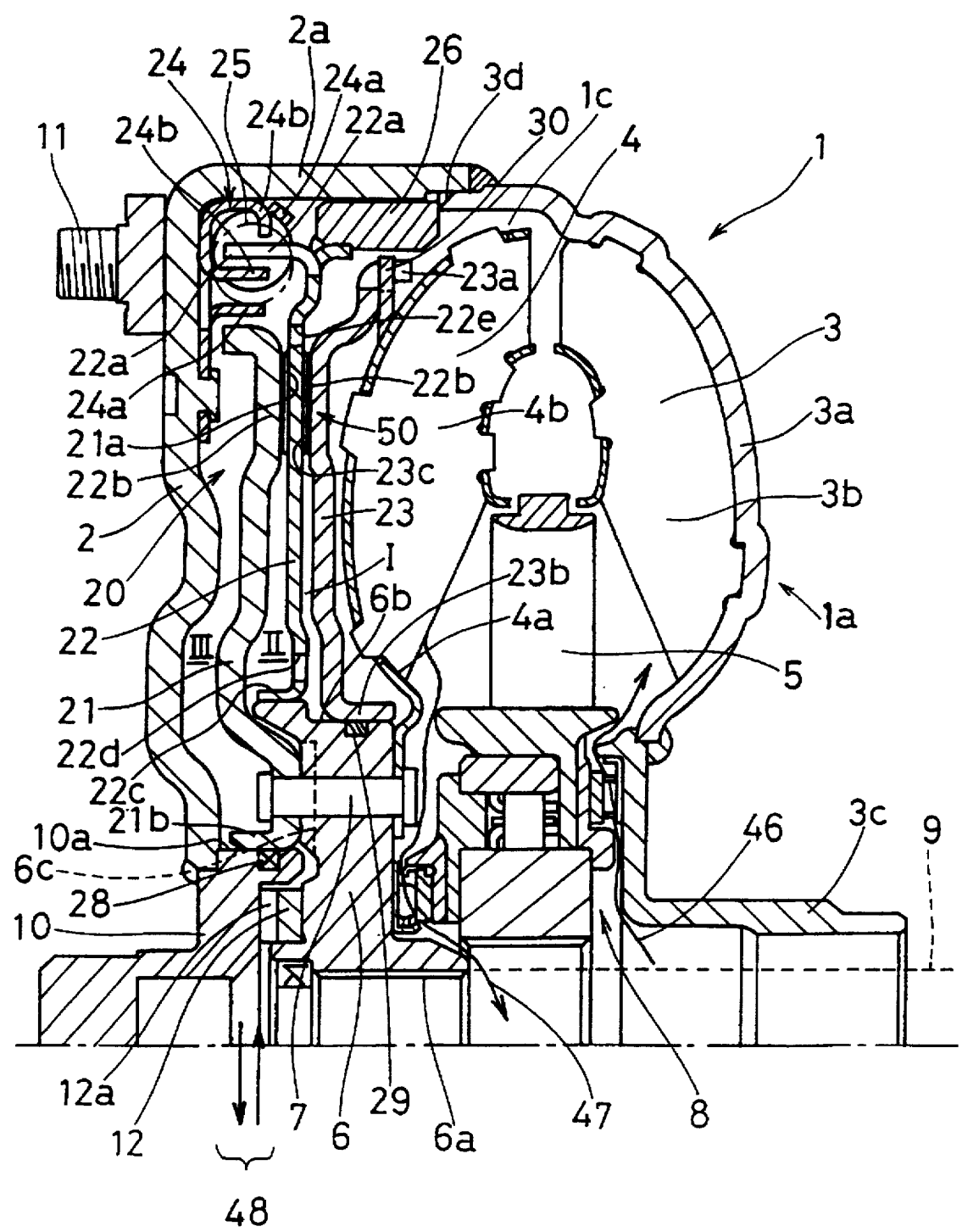
FIG. 1 is a fragmentary side sectional view of a torque convertor in accordance with one embodiment of the present invention.

FIG. 1 is a fragmentary side sectional view of a torque convertor in accordance with one embodiment of the present invention. The torque convertor 1 is a mechanism for transmitting torque from a crankshaft (not shown) in an engine (not shown) to a main drive shaft 9 of a transmission (not shown). The engine is positioned to the left in FIG. 1, while the transmission is positioned to the right in FIG. 1.

The torque convertor 1 includes a front cover 2, a torque convertor main body 1a and a lockup clutch 20. The torque converter main body 1a includes three kinds of turbine elements, namely, an impeller 3, a turbine 4 and a stator 5.

The impeller 3 is fixed to an outer circumferential portion 2a of the front cover 2 and, together with the front cover 2, defines a hydraulic oil chamber 1c. The impeller 3 includes an impeller shell 3a, impeller blades 3b and an impeller hub 3c. An outer circumferential portion 3d of the impeller shell 3a is disposed inside of and fixed to the outer circumferential portion 2a of the front cover 2. An inner diameter of the outer circumferential portion 3d is smaller than an inner diameter of the outer circumferential portion 2a. A plurality of impeller blades 3b are fixed to an inner side of the impeller shell 3a. The impeller hub 3c is fixed to an inner circumferential portion of the impeller shell 3a.

The turbine 4 includes a turbine shell 4a, turbine blades 4b and a turbine hub 6. The turbine shell 4a is positioned opposite the impeller 3 within the hydraulic oil chamber 1c. A plurality of turbine blades 4b are fixed to an inner side of the turbine shell 4a. An inner circumferential portion of the turbine shell 4a is fixed to the turbine hub 6 by rivets 7. Spline holes 6a are engaged with the main drive shaft 9 and are formed on the inner circumferential portion of the turbine hub 6. A plurality of cutaways 6c are formed in the turbine hub 6c on the engine side and extend radially outward. Each plate 21 and 23 of the lockup clutch 20 is supported on an outer circumferential surface 6b of the turbine hub 6, as is described in greater detail below.

The stator 5 is disposed between the inner circumferential portions of the impeller 3 and the turbine 4 and is supported by a fixed shaft (not shown) through a one-way clutch 8. A hub 10 is fixed to an inner circumferential portion of the front cover 2. A thrust washer 12 is disposed between the hub 10 and the turbine hub 6. A plurality of radial grooves 12a are formed in the thrust washer 12.

A bolt 11 (shown in FIG. 1) is fixed to an outer circumferential side of the front cover 2 and connects a flexible plate (not shown) with a crankshaft (not shown). It should be appreciated that several bolts 11 are spaced apart from one another on the front cover 2, but only one bolt 11 is shown.

The lockup clutch 20 is disposed in a space defined between the front cover 2 and the turbine 4 within the hydraulic oil chamber 1c of the torque converter 1. The lockup clutch 20 includes an output plate 21, an inertia plate 22, a piston plate 23, a retaining plate 24, a plurality of coil springs 25 and a weight 26. In the following description of the lockup clutch 20, the left side of FIG. 1 will be referred to as the front cover side and the right side of FIG. 1 will be referred to as the turbine side.

The output plate 21 is a annular member disposed adjacent to the front cover 2, and is formed from a gauge of metal heavier than the other elements of the lockup clutch 20. A flat annular friction surface 21a is formed on the turbine side of the outer circumferential portion of the output plate 21. The inner circumferential portion of the output plate 21 is fixed to the turbine hub 6 with the rivets 7. The inner circumferential portion of the output plate 21 is formed into an inner circumferential sleeve portion 21b extending toward the front cover side. The inner circumferential sleeve portion 21b is rotatably supported relative to the outer circumferential surface 10a of the hub 10. A seal ring 28 is disposed on a portion of the outer circumferential surface 10a of the hub 10 on which the inner circumferential sleeve portion 21b slides. The seal ring 28 prevents hydraulic oil from flowing between the inner circumferential sleeve portion 21b and the outer circumferential surface 10a of the hub 10.

The inertia plate 22 is a annular member and is disposed adjacent to the turbine side of the output plate 21. A plurality of outer circumferential claw portions 22a are formed on the outer circumferential portion of the inertia plate 22 and extend toward the front cover 2. The weight 26 is also fixed to an outer circumferential portion of the inertia plate 22. The weight 26 is an annular sleeve member extending from the inertia plate 22 toward the outer circumferential portion 3d of the impeller shell 3a. Annular friction members 22b are fixed to both sides of the inertia plate 22, one facing the friction surface 21a of the output plate 21 and the other facing a flat annular friction surface 23c disposed on the piston plate 23 (described in greater detail below).

An inner circumferential portion of the inertia plate 22 is formed into an inner circumferential sleeve portion 22c and extends toward the front cover 2. Inertia plate 22 is rotatably supported by the outer circumferential surface 6b of the turbine hub 6 and movable in the axial direction. A plurality of inner circumferential holes 22d and outer circumferential holes 22e are formed in portions of the inertia plate 22. Inner circumferential holes 22d are formed adjacent to the inner circumferential sleeve portion 22c and evenly spaced along the inner circumference of the inertia plate 22. The outer circumferential holes 22e are formed adjacent to the outer circumferential portions of the annular friction members 22b and evenly spaced along the inner circumference of the inertia plate 22.

The piston plate 23 is an annular member and is disposed between the inertia plate 22 and the turbine shell 4a. A plurality of outer circumferential claw portions 23a are formed in the outer circumferential portion of the piston plate 23 and extend toward the turbine 4. The outer circumferential claw portions 23a are engaged with a plurality of engagement projections 30 fixed to the turbine shell 4a. The engagement projections 30 restrict the rotation of the piston plate 23 with respect to the turbine shell 4a, but allow the piston plate 23 to move in the axial direction relative to the turbine shell 4a. A flat annular friction surface 23c is formed on a portion of the piston plate 23 facing the clutch cover 2 and adjacent to the friction member 22b on the inertia plate 22.

An inner circumferential portion of the piston plate 23 is formed into an inner circumferential sleeve portion 23b which extends toward the turbine 4. The piston plate 23 is rotatably supported by an outer circumferential surface 6b of the turbine hub 6 and is movable in the axial direction. An O-ring 29 is disposed on a portion of the outer circumferential surface 6b of the turbine hub 6 on which the inner circumferential sleeve portion 23b slides. The O-ring 29 prevents hydraulic oil from flowing between the outer circumferential surface 6b and the inner circumferential sleeve portion 23b.

The retaining plate 24 is a annular member and is fixed to the outer circumferential portion of the front cover 2 inside the hydraulic oil chamber 1c. The retaining plate 24 includes first retaining claws 24a and second retaining claws 24b. First retaining claws 24a retain the inner and outer circumferential portions of the coil springs 25, and the second retaining claws 24b retain the ends of the coil springs 25. The outer circumferential claw portions 22a are also in contact with the ends of the coil springs 25.

A space I is defined between the piston plate 23 and the inertia plate 22. The outer circumferential portion of the space I is closed when the friction member 22b and the friction surface 23c are in contact with each other. The inner circumferential side of the space I is closed by the O-ring 29. A space II is defined between the inertia plate 22 and the output plate 21. The outer circumferential side of the space II is closed when the friction member 22b and the friction surface 21a are in contact with each other. The space II is in fluid communication with the space I through the plurality of inner circumferential holes 22d formed in inertia plate 22. In addition, the space II is in fluid communication with a third oil passage 48 (described below) defined by the cutaways 6c in the turbine hub 6 and the grooves 12a in the washer 12. A space III is defined between the output plate 21 and the front cover 2, and is in fluid communication with the torque convertor main body 1a through outer circumferential holes 22e in the inertia plate 22. Fluid communication between the inner circumferential portion of the space III and the space II is prevented by the seal ring 28.

Figure 2:
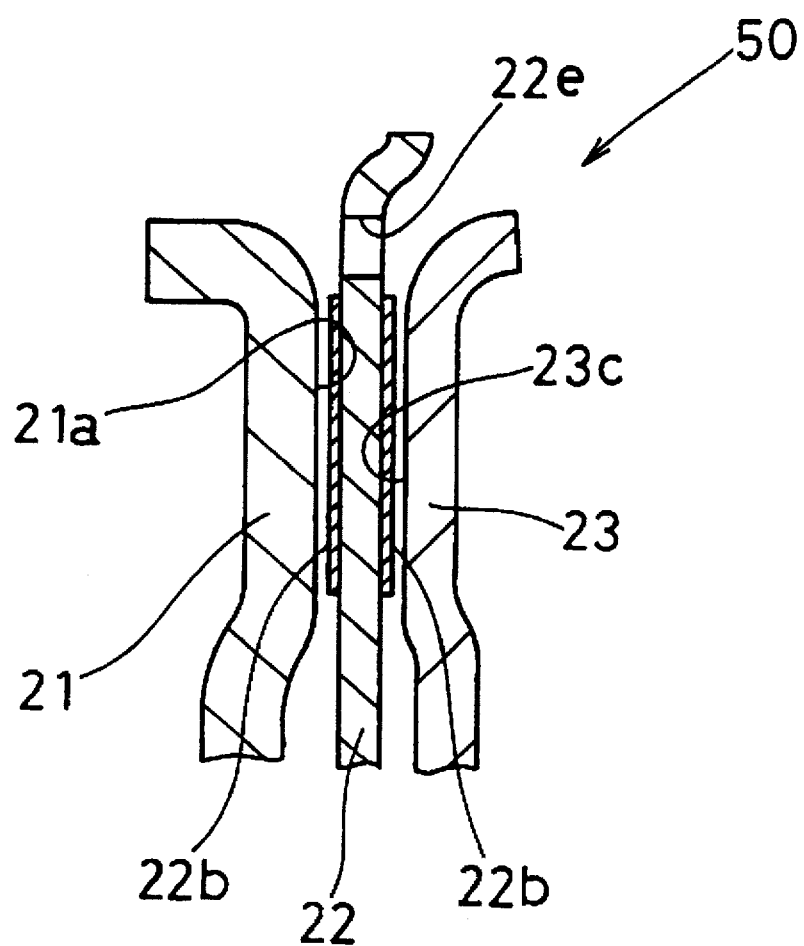
FIG. 2 is a fragmentary side sectional view of a portion a lock up clutch of the torque convertor depicted in FIG. 1, shown on a slightly enlarged scale.
Figure 3:
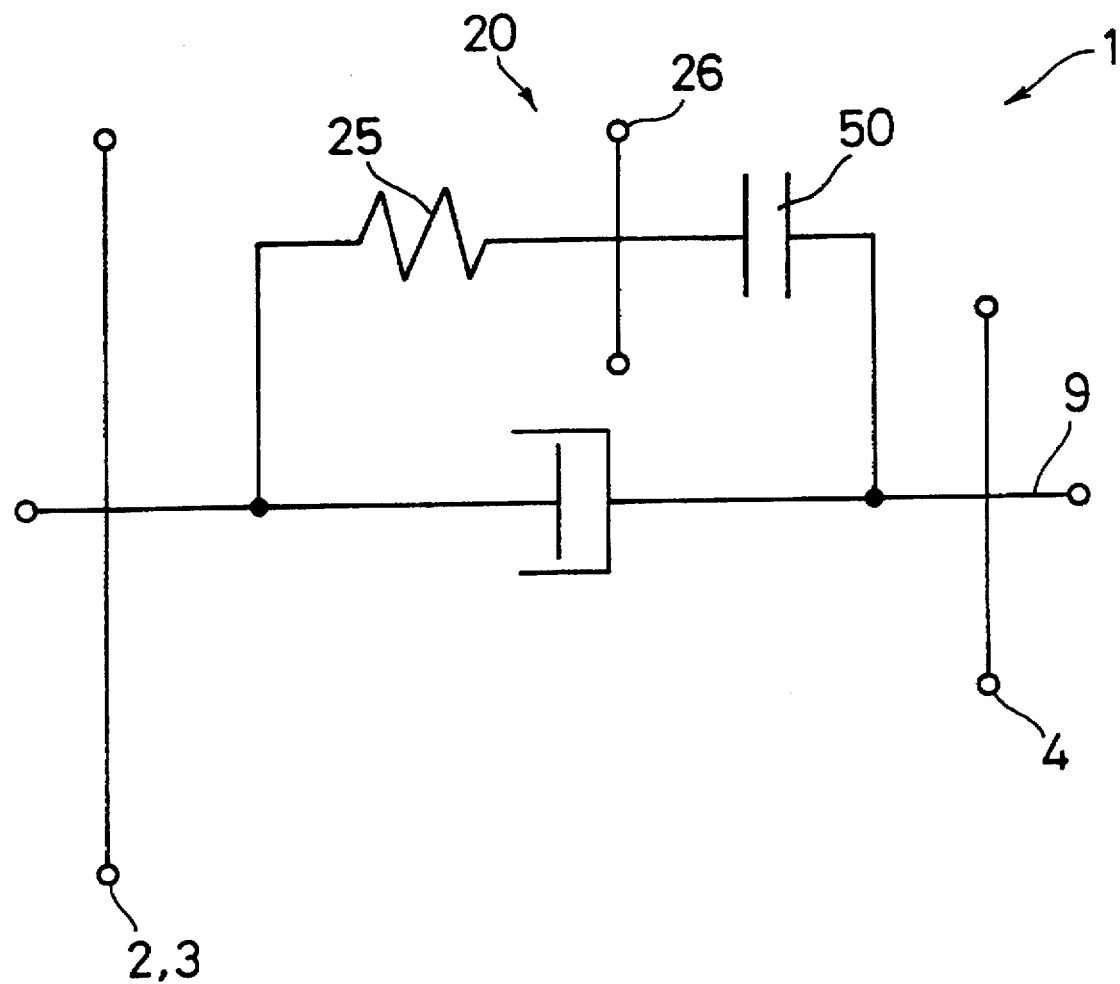
FIG. 3 is a force diagram showing a dynamic model of the torque convertor depicted in FIG. 1.

FIG. 2 shows a clutch portion 50 which includes the friction surface 21a of the output plate 21, the friction member 22b of the inertia plate 22 and the friction surface 23c of the piston plate 23.

Figure 4:
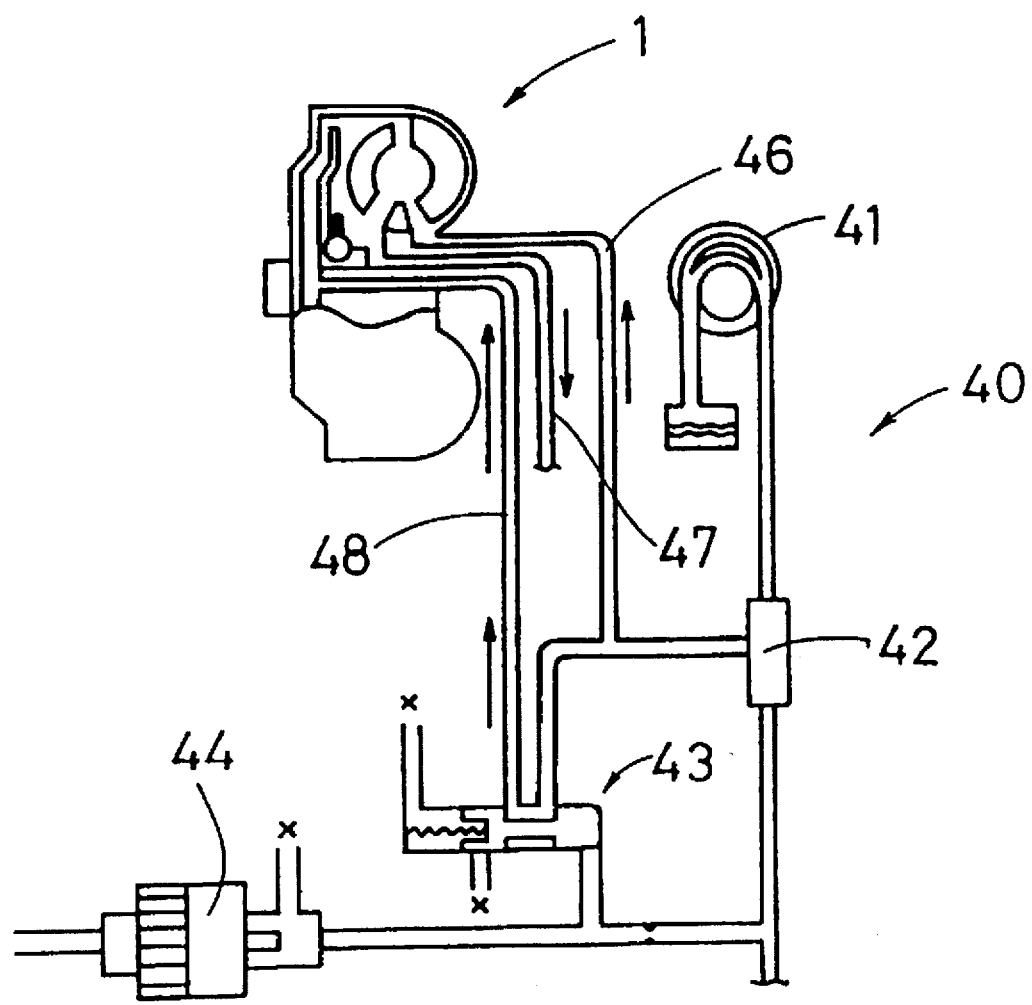
FIG. 4 is a schematic view of a hydraulic fluid control system associated with the torque converter depicted in FIG. 1, showing fluid flow in directions for lockup clutch disengagement.

FIG. 4 shows a schematic view of a hydraulic fluid control system 40 for controlling the hydraulic pressure within the torque convertor 1. Hydraulic oil is fed from an oil pump 41 to the torque convertor 1 through a pressure regulator 42, a lockup control valve 43 and a lockup solenoid 44. A first oil passage 46 extends from the pressure regulator 42 and serves to feed the hydraulic oil to the impeller 3. A second oil passage 47 serves to discharge the hydraulic oil from the turbine 4. A third oil passage 48 extends from the lockup control valve 43 and is in fluid communication with the space II via the main drive shaft 9.

The disengagement process of the lockup clutch will now be described with reference to FIG. 4. When the lockup clutch is to be disengaged, the lockup solenoid 44 is switched to the "off" position, thereby allowing hydraulic oil to drain from the lockup solenoid 44 valve. As a result, the hydraulic pressure at the piston head portion of the lockup control valve 43 is reduced. After the hydraulic pressure has been reduced to a predetermined level, the piston disposed within the lockup control valve 43 is displaced (to the right in FIG. 4). This action allows hydraulic oil to flow from the pressure regulator 42, through the lockup control valve 43, and through the third oil passage 48. The hydraulic oil then flows into the space II of the torque convertor 1. When the hydraulic pressure in space II reaches a predetermined level, the inertia plate 22 is axially displaced toward the piston plate 23. The axial displacement of the inertia plate 22 stops when the weight 26 comes into contact with the outer circumferential portion 3d of the impeller shell 3a. When this occurs, the hydraulic oil flows into the space I through the inner circumferential holes 22d in the inertia plate 22. When the hydraulic pressure in the space I reaches a predetermined level, the piston plate 23 is axially displaced toward the turbine 4. The axial displacement of the piston plate 23 stops when the outer circumferential portion thereof comes into contact with the engagement projections 30. Thus, the displacement of the inertia plate 22 and the piston plate 23 disengages the lockup clutch 20.

Because the amount of axial displacement of the inertia plate 22 is limited by the weight 26, a predetermined interval is kept between the friction surface 23c of the piston plate 23 and the friction member 22b of the inertia plate 22. As a result, the amount of drag torque generated during lockup clutch disengagement is reduced.

Figure 5:
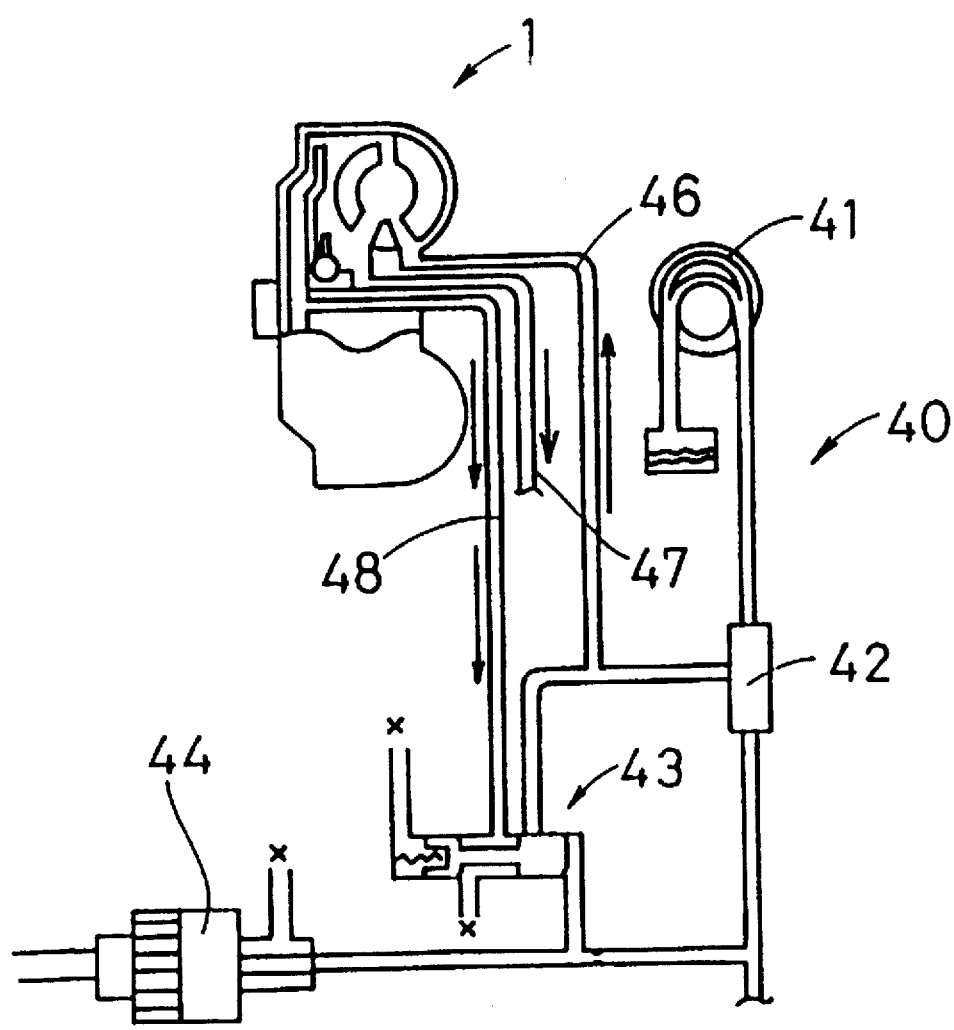
FIG. 5 is a schematic view of a hydraulic fluid control system associated with the torque converter depicted in FIG. 1, showing fluid flow in directions for lockup clutch engagement.
Figure 6:
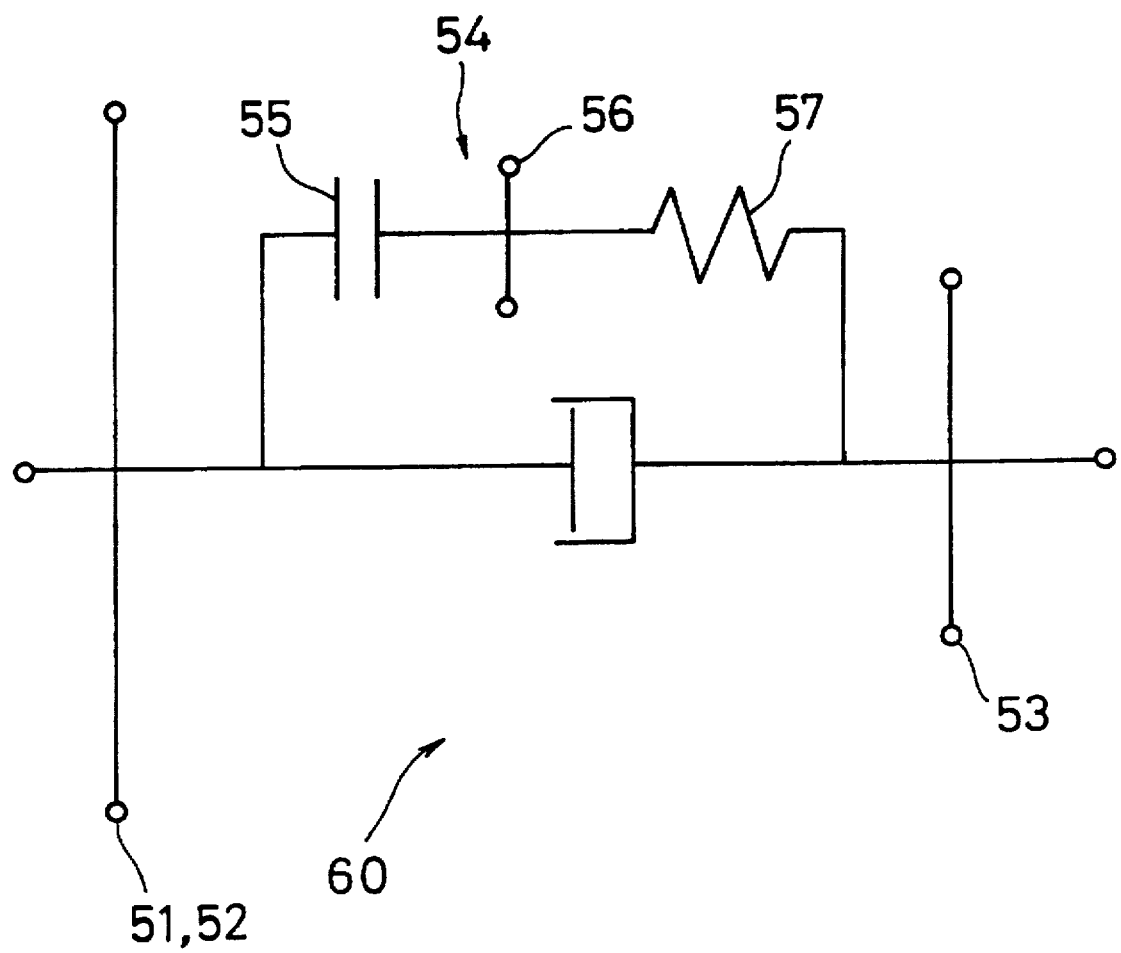
FIG. 6 is a is a force diagram showing a dynamic model of a prior art torque convertor.

The engagement process of the lockup clutch will now be described with reference to FIG. 5. When the speed of the vehicle reaches a predetermined level, the lockup solenoid 44 is switched to the "on" position in accordance with a signal from a vehicle speed sensor (not shown). The piston of the lockup control valve 43 is pushed to the left (in FIG. 5) by hydraulic oil pressure. As a result, the hydraulic oil within the space II of the torque convertor 1 is drained through the third oil passage 48 and the lockup control valve 43. When this occurs, the hydraulic oil pressure within the space II is temporarily lower than the hydraulic oil pressure in the spaces I and III. As a result, the inertia plate 22 is axially displaced toward the front cover 2. When this occurs, the hydraulic oil within the space I drains through the inner circumferential holes 22d, thereby creating a temporary drop in hydraulic oil pressure therein. This drop in pressure axially displaces the piston plate 23 toward the front cover 2. As a result, the friction surfaces 21a and 23c are brought into contact with the friction members 22b, thereby engaging the lockup clutch 20.

In the foregoing embodiment, the weight 26 is brought into contact with the outer circumferential portion 3d of the impeller shell 3a in order to limit the axial displacement of the inertia plate 22. However, it is possible to replace the weight 26 with any other type of member which will restrict the axial displacement of the inertia plate 22. In addition, the number, arrangement, shape or size of the inner circumferential holes 22d and the outer circumferential holes 22e are not limited to those of foregoing embodiment.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A torque convertor comprising:
    a torque convertor main body having a front cover, an impeller fixed to said front cover, said impeller and said front cover defining a hydraulic oil chamber, and a turbine disposed within said hydraulic oil chamber opposed to said impeller;
    a lockup clutch disposed between said front cover and said turbine, said lockup clutch including: an annular first plate disposed between said front cover and said turbine; an elastic member which couples said first plate and said front cover in a circumferential direction; an annular piston plate disposed between said turbine and said first plate, said piston plate being engaged with said turbine for rotation therewith and movable in the axial direction with respect to said turbine; and an annular second plate disposed between said front cover and said first plate and fixed to said turbine;
    a hydraulic pressure control device, controlling hydraulic pressure in said hydraulic oil chamber for controlling coupling and uncoupling of said first plate, said second plate and said piston plate;
    an annular weight member fixed to an outer circumferential portion of said first plate for rotation therewith and for limited relative rotation with respect to said torque convertor main body.

2. The torque convertor according to claim 1, wherein annular friction members are fixed to opposing axial surfaces of an outer circumferential portion of said first plate, and flat annular surfaces are formed on said piston plate and said second plate opposite said friction members.

3. The torque convertor according to claim 1, wherein said turbine includes a turbine shell, a plurality of turbine blades fixed to said turbine shell, and a turbine hub fixed to an inner circumferential portion of said turbine shell;
    an inner circumferential portion of said first plate and an inner circumferential portion of said piston plate are supported by an outer circumferential portion of said turbine hub and movable in an axial direction with respect to said turbine hub;
    an inner circumferential portion of said second plate is fixed to said turbine hub;
    said first plate further includes a plurality of holes formed therein; and
    a passage is formed in said turbine hub, said passage allowing hydraulic oil to be charged into or discharged from a space between said first plate and said second plate by means of said hydraulic pressure control device.

4. The torque convertor according to claim 1, further comprising a hub fixed to an inner circumferential portion of said front cover;
    wherein an inner circumferential portion of said second plate is in contact with an outer circumferential portion of said hub;
    a seal member is disposed between said inner circumferential portion of said second plate and said outer circumferential portion of said hub; and
    a space is formed between said front cover and said second plate, said space in fluid communication with an outer circumferential side of said torque convertor main body.

5. The torque convertor according to claim 1, wherein said impeller further includes an impeller shell and a plurality impeller blades fixed to said impeller shell;
    an outer circumferential portion of said impeller shell is fixed to an inner surface of an outer circumferential portion of said front cover; and
    said outer circumferential portion of said impeller shell is disposed adjacent to said weight member, axial movement of said weight member toward said turbine is restricted by said outer circumferential edge of said impeller shell.

6. A torque convertor comprising:

a torque convertor main body having a front cover and an impeller formed on a surface opposing said front cover, said torque convertor main body defining a hydraulic oil chamber;

a turbine disposed within said hydraulic oil chamber adjacent to said impeller;

a first annular plate disposed within said hydraulic oil chamber, said first annular plate elastically coupled to said front cover for limited rotary displacement with respect to said front cover;

an annular piston disposed between said turbine and said first annular plate, said annular piston engaging said turbine for rotation therewith and for limited axial movement with respect to said turbine; and a second annular plate disposed between said front cover and said first plate, said second annular plate fixed to said turbine for rotation therewith;

wherein said annular piston is axially moveable toward said first annular plate and said second annular plate in response to fluid pressure between said turbine and said annular piston such that said annular piston engages said first annular plate further urging said first annular plate into engagement with said second annular plate thus locking up said turbine and said main body; and an annular weight fixed to an outer circumferential edge of said first annular plate for rotation therewith and for limited relative rotary displacement with respect to said main body, said annular weight configured to engage a portion of said main body in response axial movement of said first annular plate.

7. A torque convertor comprising:

a torque convertor main body having a front cover and an impeller formed on a surface opposing said front cover, said torque convertor main body defining a hydraulic oil chamber;

a turbine disposed within said hydraulic oil chamber adjacent to said impeller;

a first annular plate disposed within said hydraulic oil chamber, said first annular plate elastically coupled to said front cover for limited rotary displacement with respect to said front cover;

an annular weight fixed to an outer circumferential edge of said first annular plate for rotation therewith and for limited relative rotation with respect to said torque convertor main body, said annular weight configured to engage a portion of said main body in response axial movement of said first annular plate;

an annular piston disposed between said turbine and said first annular plate, said annular piston engaging said turbine for rotation therewith and for limited axial movement with respect to said turbine; and a second annular plate disposed between said front cover and said first plate, said second annular plate fixed to said turbine for rotation therewith;

wherein said annular piston is axially moveable toward said first annular plate and said second annular plate in response to fluid pressure between said turbine and said annular piston such that said annular piston engages said first annular plate further urging said first annular plate into engagement with said second annular plate thus locking up said turbine and said main body.

8. The torque convertor as set forth in claim 7, wherein said second annular plate is formed of a thicker gauge material than said first annular plate and said annular piston.

* * * * *